(12) United States Patent
Flores Valdez et al.

(10) Patent No.: US 11,608,768 B2
(45) Date of Patent: Mar. 21, 2023

(54) EXHAUST FINISHER ASSEMBLY FOR A VEHICLE

(71) Applicant: Nissan North America, Inc., Franklin, TN (US)

(72) Inventors: Marco Antonio Flores Valdez, State of Mexico (MX); Carlos Alberto Fernandez Moreno, State of Mexico (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 196 days.

(21) Appl. No.: 17/004,960

(22) Filed: Aug. 27, 2020

(65) Prior Publication Data

US 2022/0065154 A1    Mar. 3, 2022

(51) Int. Cl.
| | |
|---|---|
| *B60R 13/02* | (2006.01) |
| *F01N 13/08* | (2010.01) |
| *B60R 13/08* | (2006.01) |
| *B60K 13/04* | (2006.01) |

(52) U.S. Cl.
CPC ............ *F01N 13/082* (2013.01); *B60K 13/04* (2013.01); *B60R 13/0876* (2013.01); *F01N 2240/20* (2013.01)

(58) Field of Classification Search
CPC .................................................. B60R 13/0876

USPC .......................................................... D12/194
See application file for complete search history.

(56) References Cited

U.S. PATENT DOCUMENTS

| | | | | |
|---|---|---|---|---|
| 3,318,533 | A | * 5/1967 | Besoyan | ............... F01N 13/082 239/289 |
| 9,328,649 | B2 | * 5/2016 | Kieslich | .................. F01N 13/16 |
| 2010/0096865 | A1 | * 4/2010 | McKee | ................ B60Q 1/2653 293/1 |
| 2018/0319357 | A1 | 11/2018 | Baluch | |
| 2019/0263332 | A1 | 8/2019 | Kornblatt et al. | |
| 2020/0003106 | A1 | 1/2020 | Burns et al. | |

FOREIGN PATENT DOCUMENTS

| | | | | |
|---|---|---|---|---|
| GB | 2345515 A | * | 7/2000 | ............. B60K 13/04 |
| JP | 2018119429 A | * | 8/2018 | |

* cited by examiner

*Primary Examiner* — Jonathan R Matthias
(74) *Attorney, Agent, or Firm* — Global IP Counselors, LLP

(57) ABSTRACT

An exhaust finisher assembly for a vehicle includes an exhaust finisher and a deflector. The exhaust finisher is configured to be connected to a rear bumper fascia of the vehicle. The deflector is connected to the exhaust finisher. The deflector includes a first portion connected to the exhaust finisher and a second portion extending outwardly from the first portion.

19 Claims, 5 Drawing Sheets

EXHAUST FINISHER ASSEMBLY FOR A VEHICLE

BACKGROUND

Field of the Invention

The present invention generally relates to an exhaust finisher assembly for a vehicle. More specifically, the present invention relates to an exhaust finisher assembly for a vehicle including a deflector to deflect emitted vehicle exhaust.

Background Information

A vehicle often includes an exhaust finisher to provide a visually aesthetic appearance to an exhaust pipe of the vehicle.

SUMMARY

One object of the disclosure is to provide an exhaust finisher assembly for a vehicle that deflects emitted vehicle exhaust.

In view of the state of the known technology, one aspect of the present invention is to provide an exhaust finisher assembly for a vehicle including an exhaust finisher and a deflector. The exhaust finisher is configured to be connected to a rear bumper fascia of the vehicle. The deflector is connected to the exhaust finisher. The deflector includes a first portion connected to the exhaust finisher and a second portion extending outwardly from the first portion.

Another aspect of the present invention is to provide an exhaust system for a vehicle including a rear bumper fascia, a muffler, an exhaust pipe and a first exhaust finisher assembly. The exhaust pipe extends from the muffler. The exhaust pipe has a first end connected to the muffler and a second end from which vehicle exhaust is emitted. The first exhaust finisher assembly includes an exhaust finisher connected to the rear bumper fascia and a deflector connected to the exhaust finisher. The deflector extends from the exhaust finisher in a forward direction of the vehicle to substantially prevent upward flow of the emitted vehicle exhaust.

Also other objects, features, aspects and advantages of the disclosed exhaust finisher assembly for a vehicle will become apparent to those skilled in the art from the following detailed description, which, taken in conjunction with the annexed drawings, discloses exemplary embodiments of the exhaust finisher assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
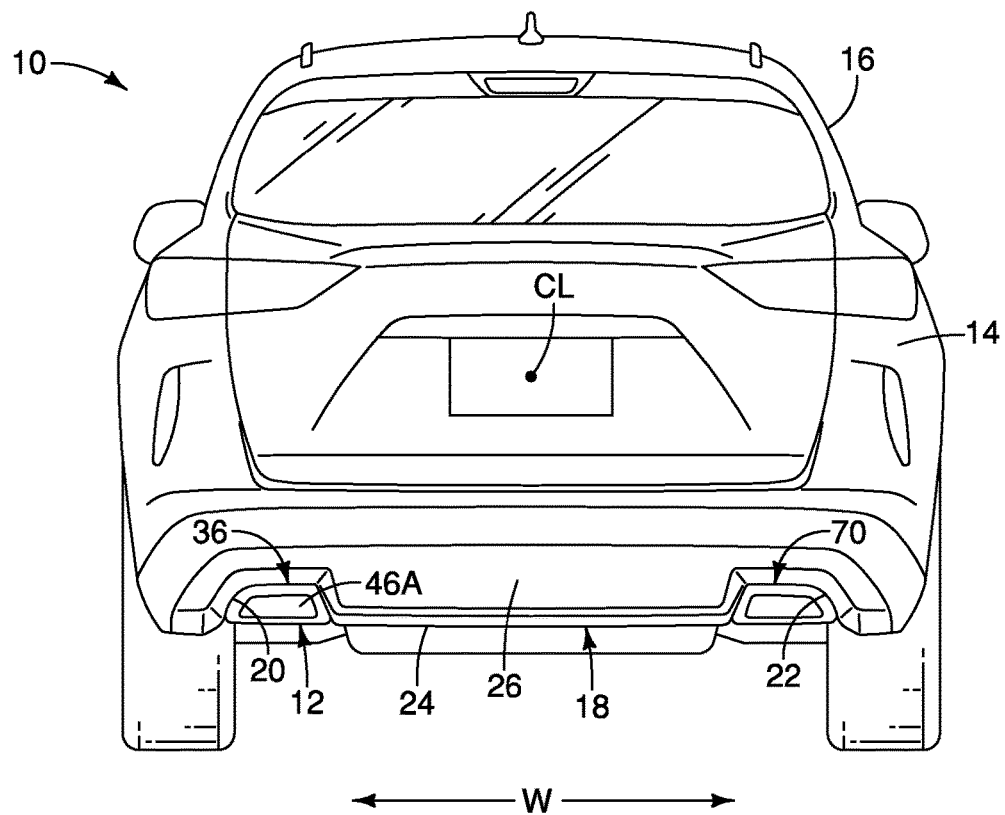
FIG. 1 is a rear elevational perspective view of a vehicle including an exhaust finisher assembly in accordance with an exemplary embodiment of the present invention.
Figure 2:
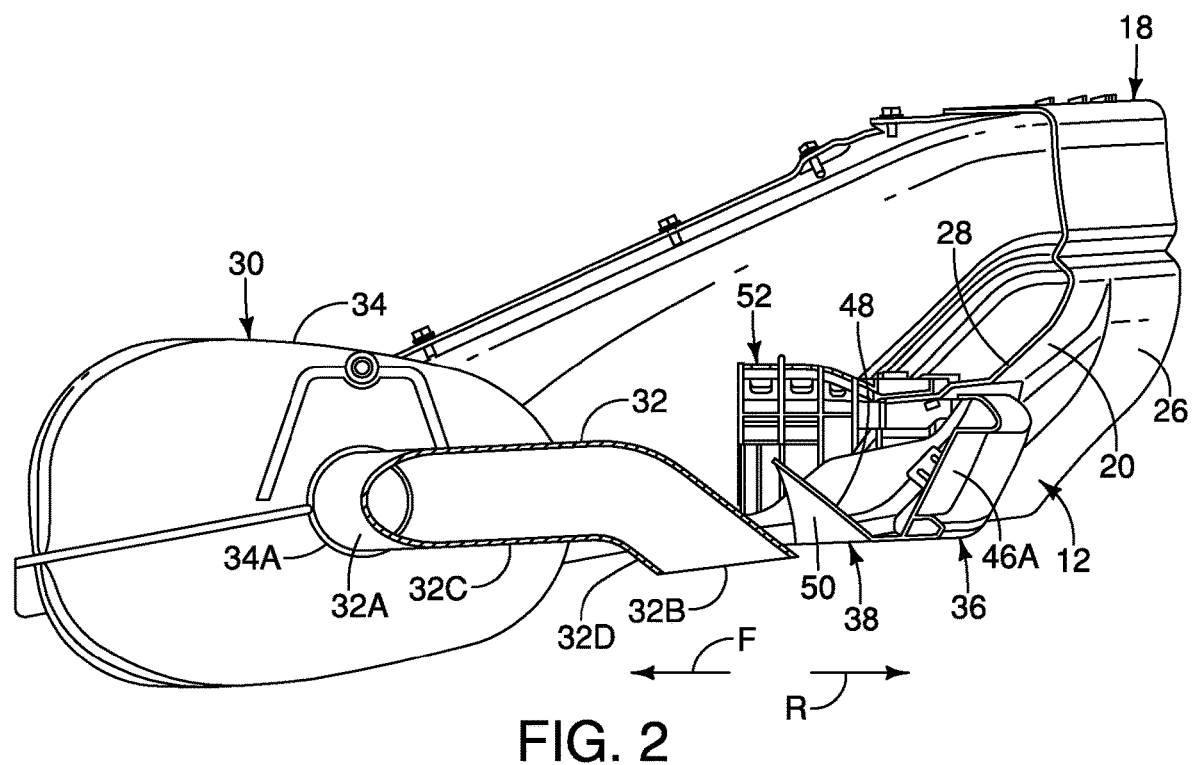
FIG. 2 is a side elevational view in cross section of the exhaust finisher assembly connected to the vehicle of FIG. 1.

Referring initially to FIGS. 1 and 2, a vehicle 10 includes an exhaust finisher assembly 12 installed to a rear end 14 of a vehicle body structure 16 of the vehicle 10. The rear end 14 of the vehicle body structure 16 includes a rear bumper (not shown) that is concealed by a rear bumper fascia 18.

The rear bumper fascia 18 includes at least one cutout portion 20. Preferably, as shown in FIG. 1, the rear bumper fascia 18 includes a first cutout portion 20 and a second cutout portion 22. The second cutout portion 22 is spaced from the first cutout portion 20 in a width direction W of the vehicle 10. The second cutout portion 22 is substantially identical to the first cutout portion 20.

Figure 3:
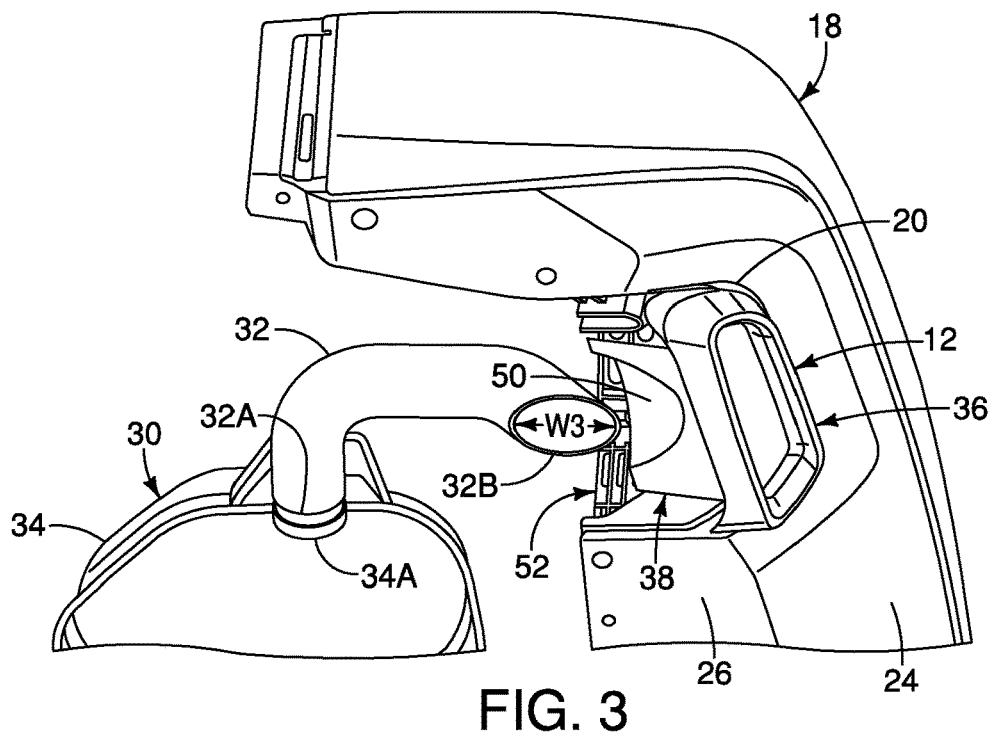
FIG. 3 is a lower perspective view of the exhaust finisher assembly connected to the vehicle of FIG. 1.
Figure 4:
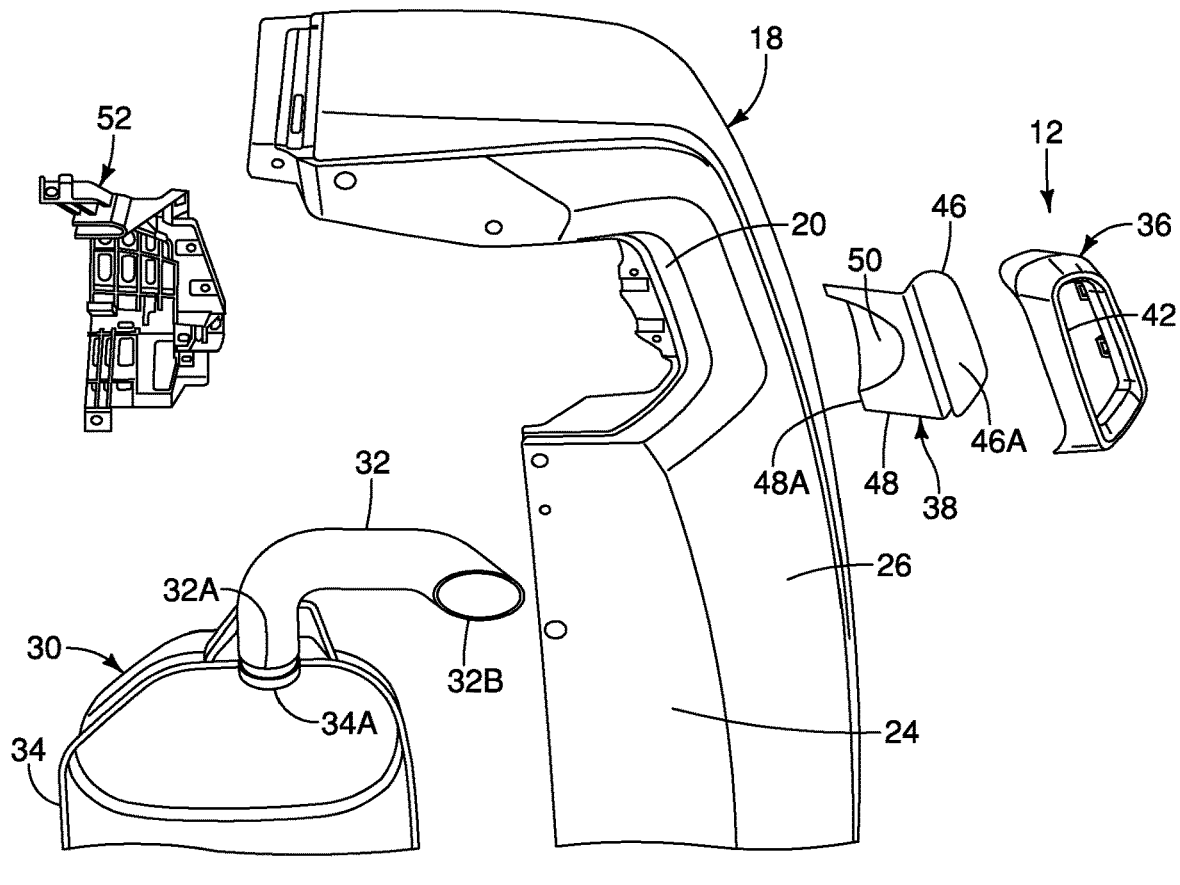
FIG. 4 is an exploded assembly view of the exhaust finisher assembly of FIG. 3.

As shown in FIG. 2, the cutout portion 20 is formed in a lower surface 24 of the rear bumper fascia 18 and extends from a first surface 26 to a second surface 28, as shown in FIGS. 1-6. The first surface 26, as shown in FIGS. 3 and 4, faces in a rearward direction of the vehicle 10. The second surface 28 faces in a forward direction of the vehicle 10. The cutout portion 20 is defined in the rear bumper fascia 18 by oppositely disposed side walls and an upper wall, as shown in FIGS. 1 and 3-6.

The vehicle 10 also includes a vehicle exhaust system 30 that is installed beneath the vehicle body structure 16 in a conventional manner, as shown in FIGS. 2-6. As shown in FIGS. 2-6, the vehicle exhaust system 30 includes at least one exhaust pipe 32 that extends rearward toward the rear bumper fascia 18 and toward the exhaust finisher 12. The vehicle exhaust system 30 carries exhaust gases away from an engine and discharges the exhaust gases from the vehicle 10 through the exhaust pipe 32. Between the engine and the exhaust pipe 32, the exhaust gases pass through a muffler 34.

The exhaust pipe 32 has a first end 32A connected to an outlet 34A of the muffler 34, as shown in FIGS. 2-6. The first end 32A of the exhaust pipe 32 can be connected to the muffler outlet 34A in any suitable manner, such as with a pipe clamp. The exhaust pipe 32 extends from the muffler 34 and has a second end 32B from which vehicle exhaust is emitted. As shown in FIG. 2, the exhaust pipe 32 includes a first exhaust pipe portion 32C and a second exhaust pipe portion 32D. The first pipe portion 32C includes the first end 32A of the exhaust pipe 32 and extends from the muffler 30. The second exhaust pipe portion 32D extends outwardly from the first pipe portion 32C and includes the second end 32B of the exhaust pipe 32. The second exhaust pipe portion 32D extends downwardly from the first exhaust pipe portion 32C such that the second end 32B of the exhaust pipe 32 faces downwardly.

It should be understood from the drawings and the description herein that the vehicle 10 depicted in the drawings can include two separate exhaust systems 30 and two corresponding exhaust finisher assemblies 12 and 70, as shown in FIG. 1. The two separate exhaust systems 30 and the respective exhaust finisher assemblies 12 and 70 are substantially identical, except that they are symmetrically mirror images of one another, description of only one exhaust system 30 and only one exhaust finisher assembly 12 is provided herein below for the sake of brevity. It should be understood that description of one of the exhaust systems 30 applies equally to both, and description of one of the exhaust finisher assemblies 12 applies equally to both. As shown in FIG. 1, the first and second exhaust finisher assemblies 12 and 70 are disposed on opposite sides of a centerline CL of the vehicle in a longitudinal direction of the vehicle 10.

The exhaust finisher assembly 12 includes an exhaust finisher 36 and a deflector 38, as shown in FIGS. 1-8. The exhaust finisher 36 is configured to be connected to the rear bumper fascia 18 of the vehicle 10, as shown in FIGS. 1-6. The exhaust finisher 36 is disposed in the cutout portion 20 of the rear bumper fascia 18. The deflector 38 is connected to the exhaust finisher 36.

Figure 7:
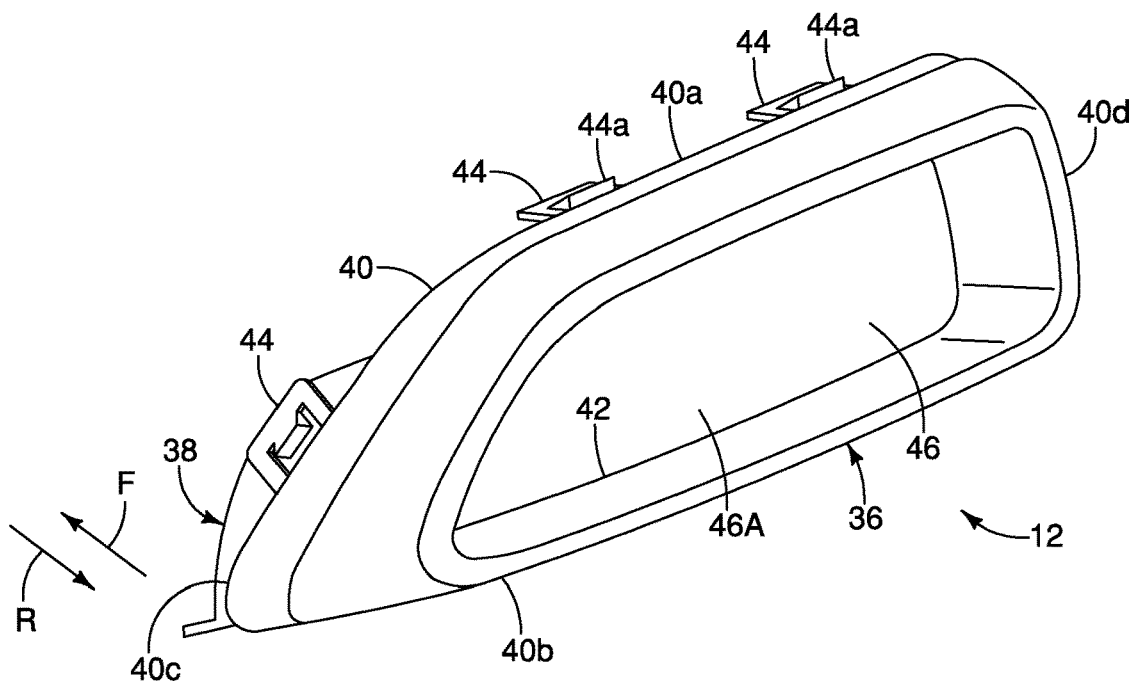
FIG. 7 is a perspective view of the exhaust finisher assembly of FIG. 2.
Figure 8:
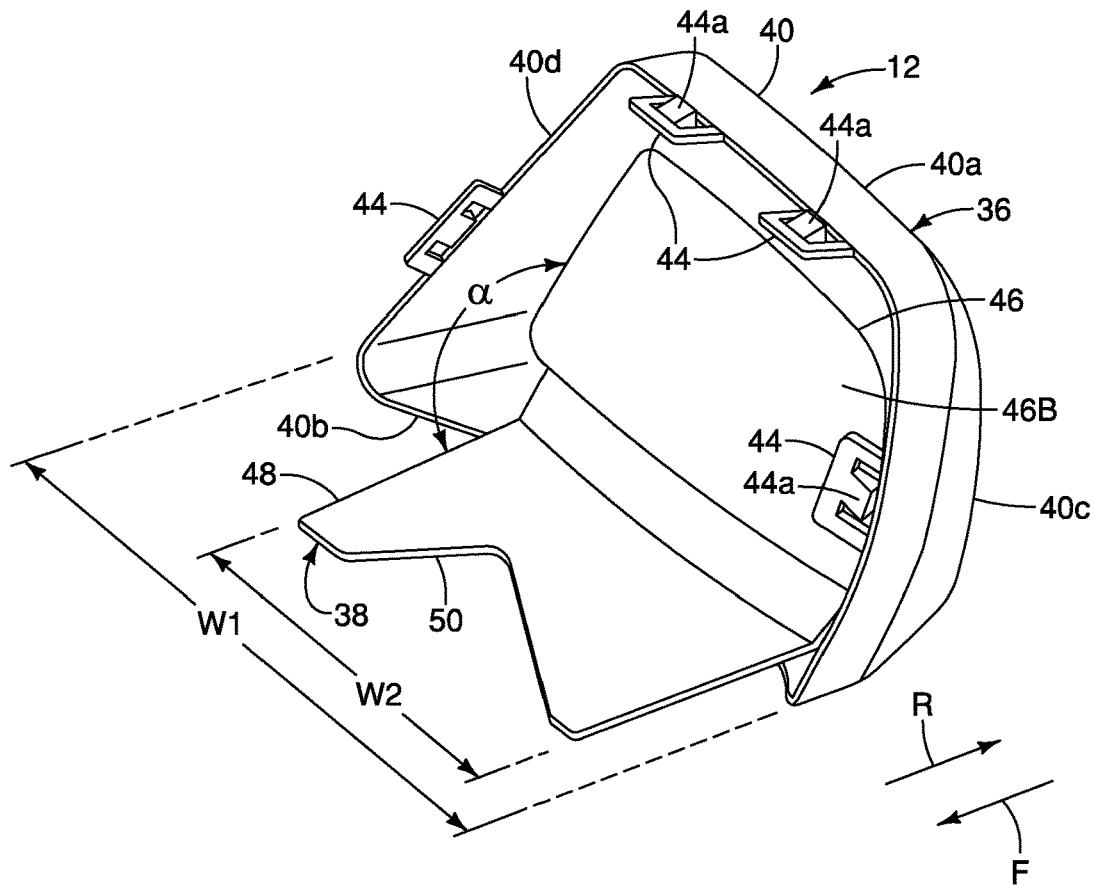
FIG. 8 is a rear perspective view of the exhaust finisher assembly of FIG. 7.

The exhaust finisher 36 includes a mounting body 40 configured to be connected to the rear bumper fascia 18, as shown in FIGS. 1-6. The mounting body 40 includes an upper wall 40a and a lower wall 40b connected by oppositely disposed side walls 40c and 40d, as shown in FIGS. 7 and 8. The mounting body 40 of the exhaust finisher 36 includes an opening 42, as shown in FIGS. 4 and 6-8, defined by the upper wall 40a, the lower wall 40b and the side walls 40c and 40d. The opening 42 extends completely through the mounting body 40 of the exhaust finisher 36 in a longitudinal direction of the vehicle. The exhaust finisher 36 has a first width W1, as shown in FIG. 8. The exhaust finisher 36 is preferably made of a plastic material, such as a resin, although any suitable material can be used. Preferably, the material is corrosion resistant. The exhaust finisher 36 is preferably unitarily formed as a one-piece member.

A plurality of mounting tabs 44 extend from the mounting body 40 to connect the exhaust finisher 36 to the rear bumper fascia 18, as shown in FIGS. 7 and 8. Two mounting tabs 44 are connected to the upper wall 40a, and one mounting tab 44 is connected to each of the side walls 40c and 40d, although any suitable configuration can be used. The mounting tabs 44 extend in a forward direction F of the vehicle from a forward edge of the respective wall of the mounting body 40. Each of the mounting tabs 44 includes a flexible hook 44a configured to be received by a corresponding opening in the rear bumper fascia 18.

The deflector 38 is connected to the exhaust finisher 36, as shown in FIGS. 1-8. The deflector 38 includes a first portion 46 and a second portion 48. The first portion 46 is connected to the exhaust finisher 36. The second portion 48 extends outwardly from the first portion 46. As shown in FIG. 8, the second portion 48 extends in the forward direction F of the vehicle. The deflector 38 is preferably unitarily formed as a one-piece member. The deflector is preferably made of a plastic material, such as a resin. Preferably, the material is corrosion resistant.

The first portion 46 of the deflector 38 is connected to a forward facing surface of the mounting body 40 of the exhaust finisher 36, as shown in FIG. 8. The first portion 46 of the deflector 38 can be connected to the mounting body 40 of the exhaust finisher 36 in any suitable manner, such as with an adhesive or fastener, such as a snap clip. The first portion 46 is connected to the exhaust finisher 36 such that an entirety of the opening 42 of the mounting body 40 is covered by the first portion 46, as shown in FIGS. 7 and 8. In other words, the first portion 46 of the deflector 38 prevents the exhaust pipe 32 (FIG. 2) from being visible through the opening 42 in the exhaust finisher 36, as shown in FIG. 1. The first portion 46 has a rearward facing surface 46A visible through the opening 42 when viewed in the forward direction F of the vehicle. A forward facing surface 46B of the first portion 46 of the deflector 38 faces toward the exhaust pipe 32. A width W2 of the second portion 48 of the deflector 38 is less than a width W1 of the exhaust deflector 36 in a lateral direction of the vehicle, as shown in FIG. 8.

Figure 6:
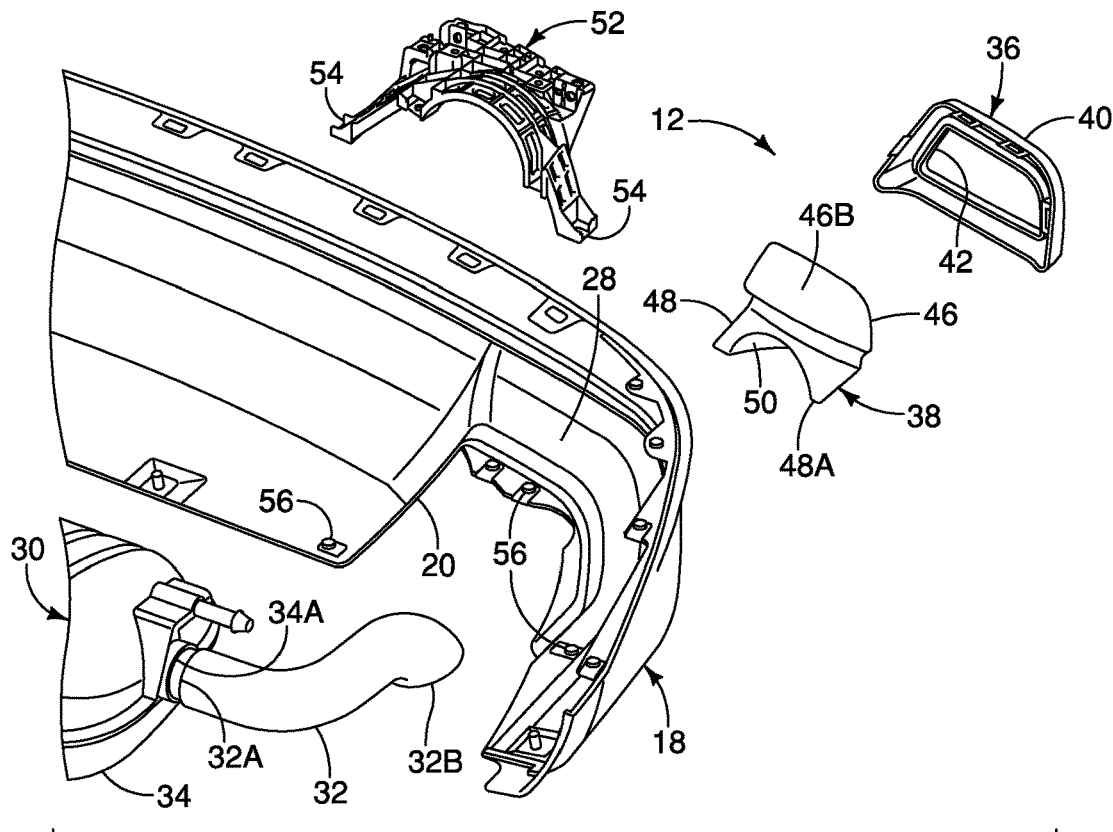
FIG. 6 is an exploded assembly view of the exhaust finisher assembly of FIG. 5.

The second portion 48 of the deflector 38 extends from the first portion 46, as shown in FIGS. 4, 6 and 8. The second portion 48 extends in the forward direction F of the vehicle. As shown in FIG. 6, the deflector 38 preferably is substantially L-shaped, although the deflector can have any suitable shape. As shown in FIG. 8, an angle α is defined between the first portion 46 and the second portion 48 of the deflector 38. The angle α can be any suitable angle, such as approximately 90 degrees, as shown in FIG. 8.

The second portion 48 includes a curved, or contoured, portion 50, as shown in FIGS. 2-6 and 8. The curved portion 50 extends from a rear edge 48A of the second portion 48 toward the first portion 46, as shown in FIG. 4. The curved portion 50 has a height at the rear edge 48A to accommodate the second portion 32D of the exhaust pipe 32. The height of the curved portion 50 decreases in a direction toward the first portion 46 of the deflector 38. A width of the curved portion 50 decreases in a direction toward the first portion 46 of the deflector 38.

Figure 5:
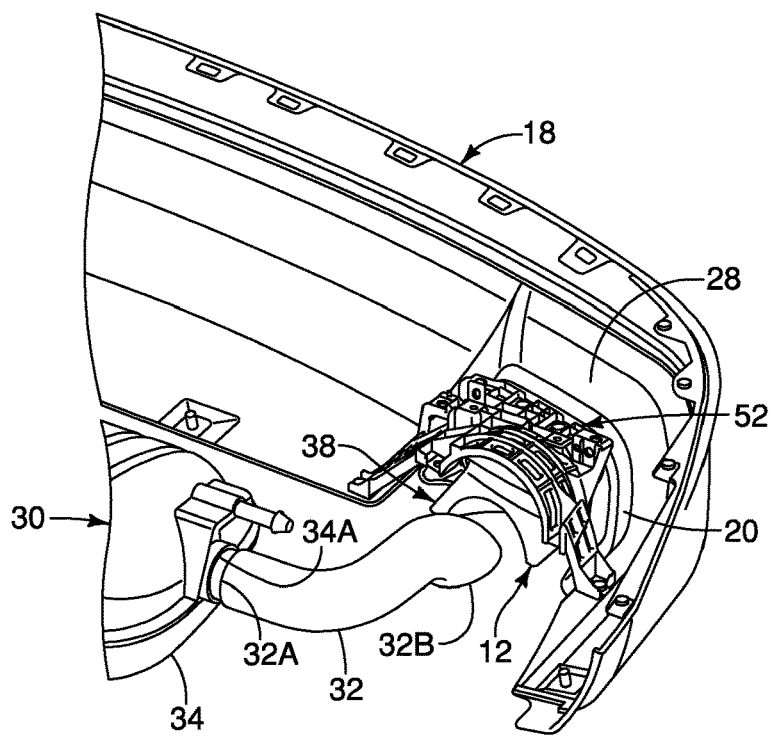
FIG. 5 is an upper perspective view of the exhaust finisher assembly connected to the vehicle of FIG. 1.

A reinforcement bracket 52 is connected to the rear bumper fascia 18, as shown in FIGS. 2-6. The reinforcement bracket 52 includes a plurality of mounting portions 52 configured to receive fasteners 56 of the rear bumper fascia 18. The fasteners 56 are disposed on the rear bumper fascia 18 proximate the cutout portion 20, as shown in FIG. 6. Two fasteners 56 are disposed proximate an upper wall of the cutout portion 20 and one fastener is disposed proximate each of the side walls of the cutout portion 20, although any suitable configuration can be used. The reinforcement bracket 52 includes a plurality of openings configured to receive the flexible hooks 44a of the mounting clips 44 of the exhaust finisher 36, as shown in FIGS. 2, 3 and 5, such that the exhaust finisher 36 is connected to the reinforcement bracket 52. The reinforcement bracket 52 increases the stiffness of the rear bumper fascia 18. Alternatively, the exhaust finisher 36 can be connected to the rear bumper fascia 18.

As shown in FIGS. 2, 3 and 5, the reinforcement bracket 52 is connected to the rear bumper fascia 18. The exhaust finisher 36 is connected to the reinforcement bracket 52, such that the exhaust finisher 36 is disposed in the cutout portion 20 of the rear bumper fascia. No portion of the rear bumper fascia 18 is disposed beneath the exhaust finisher 36, as shown in FIGS. 1 and 3-6. As shown in FIG. 2, the deflector 38 extends forward of the second end 32B of the exhaust pipe 32 in the longitudinal direction of the vehicle. In other words, the rear edge 48A of the second portion 48 of the deflector 38 extends forward of the second end 32B of the exhaust pipe 32. The curved portion 50 of the deflector 38 accommodates the second portion 32D of the exhaust pipe 32. The curved portion 50 accommodating the second portion 32D of the exhaust pipe 32 allows for any suitable angle α between the first portion 146 and the second portion 148 of the deflector 138, as shown in FIG. 8. The angle α is shown as being approximately 90 degrees in FIG. 8, although any suitable angle can be used. The width W2 of the deflector 38 is preferably larger than a width W3 of the second end 32B of the exhaust pipe 32, as shown in FIGS. 2 and 8. The width W2 of the deflector 38 is at least substantially equal to the width W3 of the second end 32B of the exhaust pipe 32.

The deflector 38 is spaced from the exhaust pipe 32, as shown in FIGS. 2, 3 and 5. The deflector 38 of the exhaust finisher assembly 12 is spaced from and forward of the second end 32B of the exhaust pipe 32 to substantially prevent emitted vehicle exhaust from flowing in an upward direction. In other words, the deflector 38 facilitates directing emitted vehicle exhaust to an exterior of the vehicle and substantially prevents the emitted vehicle exhaust from flowing between the rear bumper fascia 18 and an underfloor of the vehicle. The deflector 38 is spaced from the exhaust pipe 32 such that the deflector 38 can be made of a material that has a low heat resistance.

Figure 9:
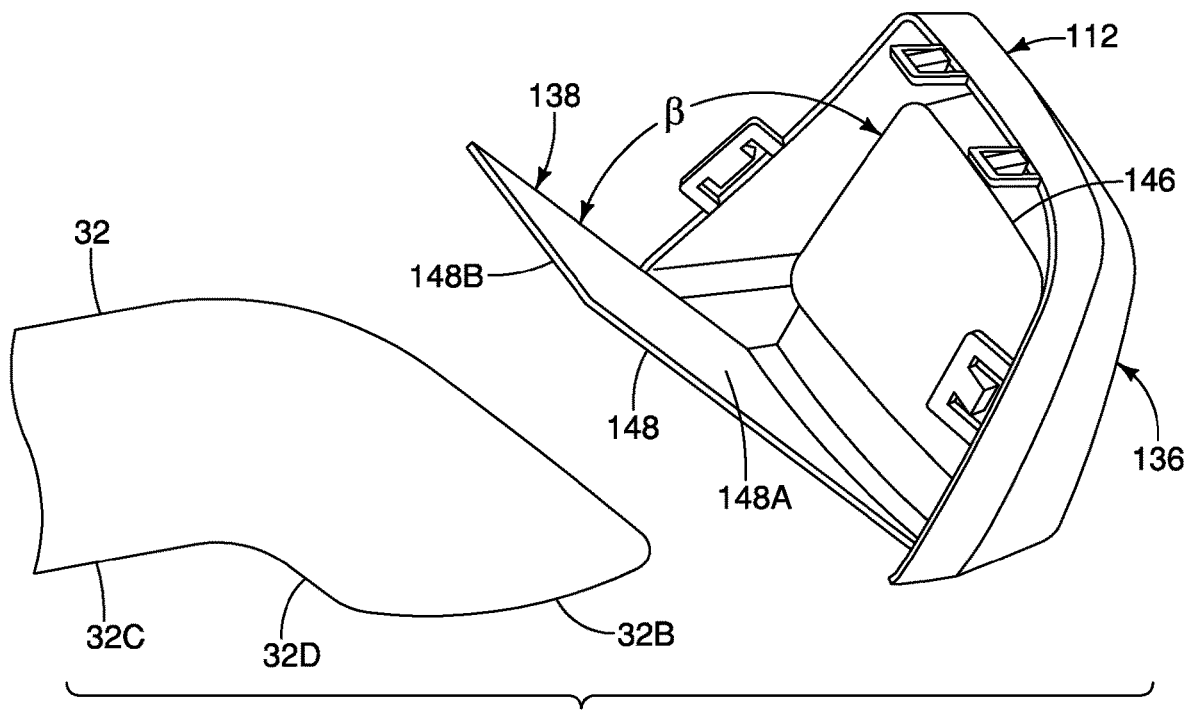
FIG. 9 is a rear perspective view of an exhaust finisher assembly in accordance with another exemplary embodiment of the present invention.

As shown in FIG. 9, an exhaust finisher assembly 112 in accordance with another illustrated exemplary embodiment of the present invention is substantially similar to the exhaust finisher assembly 12 of the exemplary embodiment illustrated in FIGS. 1 to 8 except for the differences described below. Similar parts are identified with similar reference numerals, except increased by 100 (i.e., 1xx, accordingly).

The second portion 148 extends in a forward direction from the first portion 146 of the deflector 138. The first portion 146 of the deflector 138 is connected to the exhaust finisher 136. An angle β is formed between the first portion 146 and the second portion 148 of the deflector 138. The angle β is preferably less than 90 degrees. The second portion 148 of the deflector 138 is substantially planar. A first surface 148A of the second portion 148 of the deflector faces away from the exhaust pipe 32, and the second surface 148B of the second portion 148 of the deflector 138 faces toward the exhaust pipe 32. A lowermost portion of the deflector 138 is disposed above a lowermost portion of the exhaust finisher 136. The second portion 148 of the deflector 138 is spaced from the second portion 32D of the exhaust pipe 32.

Figure 10:
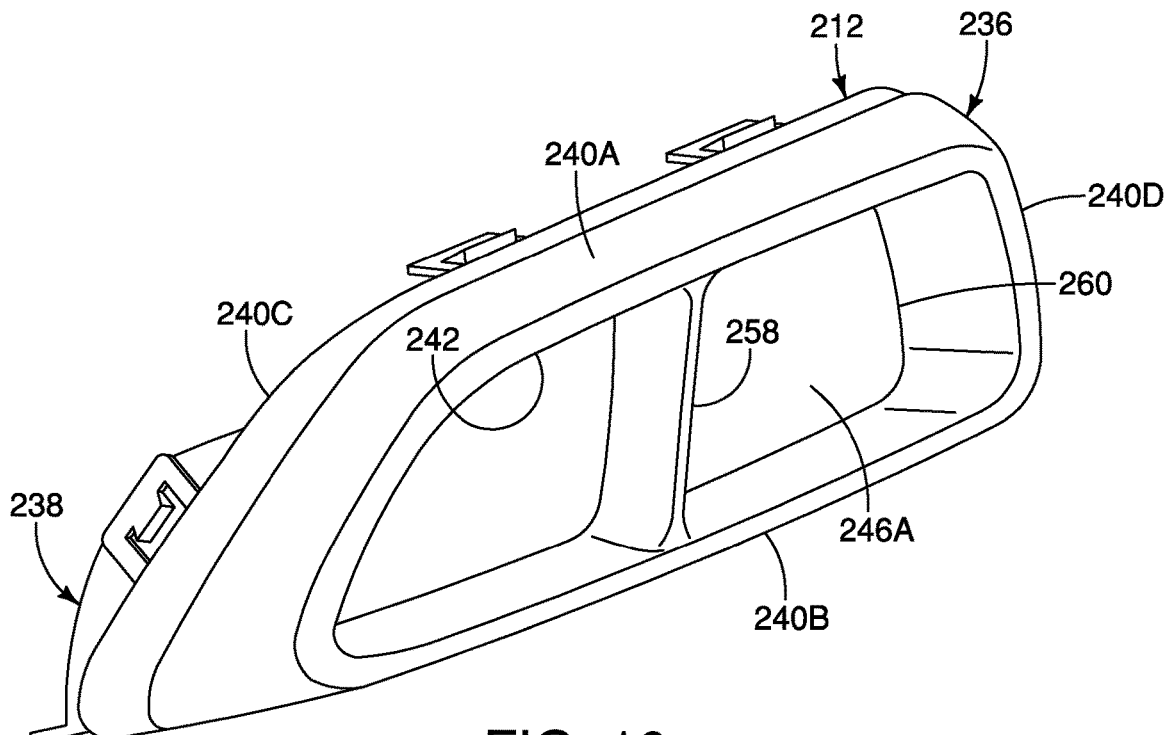
FIG. 10 is a front perspective view of an exhaust finisher assembly in accordance with another exemplary embodiment of the present invention.

As shown in FIG. 10, an exhaust finisher assembly 212 in accordance with another illustrated exemplary embodiment of the present invention is substantially similar to the exhaust finisher assembly 12 of the exemplary embodiment illustrated in FIGS. 1 to 8 except for the differences described below. Similar parts are identified with similar reference numerals, except increased by 200 (i.e., 2xx, accordingly).

The mounting body 240 of the exhaust finisher 236 includes an upper wall 240a and a lower wall 240b connected by oppositely disposed side walls 240c and 240d, as shown in FIG. 10. A rib 258 extends between the upper wall 240A and the lower wall 240B. The rib 258 preferably extends in a substantially vertical direction. A first opening 242 is defined in the mounting body 240 by the upper wall 240A, the side wall 240C, the lower wall 240B and the rib 258. A second opening 260 is defined in the mounting body 240 by the upper wall 240A, the side wall 240D, the lower wall 240B and the rib 258. The first and second openings 242 and 260 are disposed adjacent one another on opposite sides of the rib 258. The first portion 246 of the deflector 238 covers the entirety of the first and second openings 242 and 260. The rearward facing surface 246A of the deflector 238 is visible through the first and second openings 242 and 260, such that the exhaust pipe 32 (FIG. 2) is prevented from being visible through the first and second openings 242 and 260 in the exhaust finisher 236.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle frame equipped with the exhaust finisher assembly. Accordingly, these terms, as utilized to describe the present invention should be interpreted relative to a vehicle equipped with the exhaust finisher assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. An exhaust finisher assembly for a vehicle, comprising:
an exhaust finisher configured to be connected to a rear bumper fascia of the vehicle, the exhaust finisher including an opening; and
a deflector connected to the exhaust finisher, the deflector including a first portion connected to the exhaust finisher and a second portion extending outwardly from the first portion, the first portion of the deflector covering an entirety of the opening, the first portion being non-transparent.

2. The exhaust finisher assembly for a vehicle according to claim 1, wherein
the exhaust finisher includes a first opening disposed adjacent a second opening, the first and second openings being separated by a vertically extending rib of the exhaust finisher, the first portion of the deflector covering an entirety of the first and second openings.

3. The exhaust finisher assembly for a vehicle according to claim 1, wherein
the second portion includes a curved portion.

4. The exhaust finisher assembly for a vehicle according to claim 1, wherein
the second portion is substantially planar.

5. The exhaust finisher assembly for a vehicle according to claim 1, wherein
the first portion is connected to the exhaust finisher with an adhesive.

6. The exhaust finisher assembly for a vehicle according to claim 1, wherein
the first portion is connected to the exhaust finisher by a plurality of snap clips.

7. The exhaust finisher assembly for a vehicle according to claim 1, wherein
an angle between the first and second portions is less than 90 degrees.

8. The exhaust finisher assembly for a vehicle according to claim 1, wherein
a first width of the deflector is less than a second width of the exhaust finisher.

9. The exhaust finisher assembly for a vehicle according to claim 1, wherein
a lowermost portion of the deflector is above a lowermost portion of the exhaust finisher.

10. The exhaust finisher assembly for a vehicle according to claim 1, wherein
the deflector is unitarily formed as a one-piece member.

11. An exhaust system for a vehicle, comprising:
a rear bumper fascia;
a muffler;
an exhaust pipe extending from the muffler, the exhaust pipe having a first end connected to the muffler and a second end from which vehicle exhaust is emitted; and
a first exhaust finisher assembly including
an exhaust finisher connected to the rear bumper fascia, the exhaust finisher including an opening; and
a deflector including a first portion connected to the exhaust finisher and a second portion extending outwardly from the exhaust finisher in a forward direction of the vehicle to substantially prevent upward flow of the emitted vehicle exhaust, the first portion of the deflector covering an entirety of the opening, the first portion being non-transparent.

12. The exhaust system for a vehicle according to claim 11, wherein
the deflector extends forward of the second end of the exhaust pipe in a longitudinal direction of the vehicle.

13. The exhaust system for a vehicle according to claim 11, wherein
a cutout portion is defined in the rear bumper fascia by oppositely disposed side walls and an upper wall, the exhaust finisher being disposed in the cutout portion.

14. The exhaust system for a vehicle according to claim 11, wherein
the deflector is spaced from the exhaust pipe.

15. The exhaust system for a vehicle according to claim 11, wherein
a reinforcement bracket is connected to the rear bumper fascia.

16. The exhaust system for a vehicle according to claim 15, wherein
the exhaust finisher is connected to the reinforcement bracket.

17. The exhaust system for a vehicle according to claim 11, wherein
a first width of the deflector is larger than a second width of the second end of the exhaust pipe.

18. The exhaust system for a vehicle according to claim 11, wherein
the exhaust pipe includes a first exhaust pipe portion extending from the muffler and a second exhaust pipe portion extending from the first portion, the second exhaust pipe portion extending downwardly from the first exhaust pipe portion.

19. The exhaust system for a vehicle according to claim 11, wherein
a second exhaust finisher assembly is connected to the rear bumper fascia, the first and second exhaust finisher assemblies being disposed on opposite sides of a vehicle centerline.

* * * * *